US010088649B2

(12) United States Patent
Devilliers et al.

(10) Patent No.: US 10,088,649 B2
(45) Date of Patent: Oct. 2, 2018

(54) DEFORMABLE MIRROR (71) Applicants: THALES, Courbevoie (FR); CENTRE NATIONAL D'ETUDES SPATIALES, Paris (FR)

(72) Inventors: Christophe Devilliers, St Raphael (FR); Félix Aguilar, Nice (FR); Kamel Houairi, Cannes la Bocca (FR); Aurélien Suau, Cannes la Bocca (FR)

(73) Assignees: THALES, Courbevoie (FR); CENTRE NATIONAL D'ETUDES SPATIALES, Paris (FR)

( * ) Notice: Subject to any disclaimer, the term of this patent is extended or adjusted under 35 U.S.C. 154(b) by 0 days.

(21) Appl. No.: 15/422,030

(22) Filed: Feb. 1, 2017

(65) Prior Publication Data

US 2017/0219796 A1    Aug. 3, 2017

(30) Foreign Application Priority Data

Feb. 3, 2016    (FR) .................................... 16 00184

(51) Int. Cl.
*G02B 7/182* (2006.01)
*G02B 26/08* (2006.01)

(52) U.S. Cl.
CPC ......... *G02B 7/182* (2013.01); *G02B 26/0825* (2013.01)

(58) Field of Classification Search
CPC ........ G02B 7/182; G02B 7/183; G02B 7/185; G02B 7/188; G02B 7/192
USPC .............................................. 359/224.1, 848
See application file for complete search history.

(56) References Cited

U.S. PATENT DOCUMENTS

| 5,434,697 | A | * | 7/1995 | Ameer | G02B 26/06 |
| | | | | | 359/224.1 |
| 5,777,807 | A | * | 7/1998 | Bar | B23K 26/06 |
| | | | | | 359/224.1 |
| 5,986,795 | A | * | 11/1999 | Chapman | G02B 26/06 |
| | | | | | 359/224.1 |
| 6,108,121 | A | * | 8/2000 | Mansell | G02B 26/0841 |
| | | | | | 359/224.1 |
| 6,181,459 | B1 | * | 1/2001 | La Fiandra | G02B 26/06 |
| | | | | | 359/224.1 |
| 6,236,490 | B1 | * | 5/2001 | Shen | G02B 26/06 |
| | | | | | 359/247 |

(Continued)

FOREIGN PATENT DOCUMENTS

EP    2 860 563 A1    4/2015

*Primary Examiner* — Frank Font
(74) *Attorney, Agent, or Firm* — Baker & Hostetler LLP (57) ABSTRACT A deformable mirror comprises a deformable membrane extending at rest in a first plane and having a reflecting front face and a back face opposite the front face, a supporting structure, an actuator having a first and second end, the first end fixed to the supporting structure, the second end displaced relative to the first end on a first axis substantially at right angles to the first plane to exert, on the back face, an axial load on the first axis, to locally deform the deformable membrane. The mirror comprises a plate that is substantially flat in a second plane substantially parallel to the first plane, positioned between the actuator and deformable membrane, linked to the back face and deformed when the actuator exerts the axial load, and the plate is rigid in the second plane to take up loads applied to the mirror in the second plane.

8 Claims, 7 Drawing Sheets

(56) References Cited

U.S. PATENT DOCUMENTS

| | | | |
|---|---|---|---|
| 6,398,372 B1* | 6/2002 | Okada | G02B 26/0825 |
| | | | 359/846 |
| 8,139,280 B2* | 3/2012 | Wu | G02B 26/0858 |
| | | | 359/224.1 |
| 9,314,980 B2* | 4/2016 | Southard | B29D 11/00596 |
| 9,810,900 B2* | 11/2017 | Camet | G02B 26/0825 |
| 2001/0008469 A1* | 7/2001 | Bar | B23K 26/0643 |
| | | | 359/846 |
| 2004/0017623 A1* | 1/2004 | Watson | G02B 7/182 |
| | | | 359/849 |
| 2004/0085657 A1* | 5/2004 | Gullapalli | G02B 7/183 |
| | | | 359/849 |
| 2006/0193065 A1* | 8/2006 | Novak | G02B 26/06 |
| | | | 359/849 |
| 2006/0232846 A1* | 10/2006 | Himmer | G02B 26/06 |
| | | | 359/224.1 |
| 2008/0225370 A1* | 9/2008 | Mansell | B81C 1/00158 |
| | | | 359/224.1 |
| 2008/0316563 A1* | 12/2008 | Aksyuk | B81C 1/00476 |
| | | | 359/224.1 |
| 2011/0019295 A1 | 1/2011 | Rooms et al. | |
| 2014/0307243 A1 | 10/2014 | Sai | |

* cited by examiner

DEFORMABLE MIRROR

CROSS-REFERENCE TO RELATED APPLICATIONS

This application claims priority to foreign French patent application No. FR 1600184, filed on Feb. 3, 2016, the disclosure of which is incorporated by reference in its entirety.

FIELD OF THE INVENTION

The invention falls within the field of active space optics and relates to a deformable mirror, also known as active mirror deformed by an actuator.

BACKGROUND

A telescope has a main mirror, also called primary mirror. The primary mirror concentrates the light rays to a secondary mirror which returns them to the focus of the telescope. The primary mirror must not be deformed under the effect of gravity for example. Often, a deformable intermediate mirror is used to correct the defects of the primary mirror. Also, the intermediate mirror is deformed by one or more actuators.

Modern telescopes are equipped with so-called "active" deformable optics. The mirror of such a telescope is therefore deformed permanently by actuators fixed directly on to the back of the mirror in order to always optimize the optical performance levels of the telescope.

To have a good resolution, the actuators have a floating head mounted on springs making it possible to divide the displacement of the actuator by a significant factor.

Nevertheless, the connection between the mirror and the floating head of the actuator poses several problems. First of all a significant integration defect generating a deformation of the mirror that cannot be corrected is regrettable. This is due to what is called parasitic torques. A poor alignment and guiding of the floating head by the springs can also occur, which causes parasitic torques to be injected when the actuator is operating to deform the mirror. Finally, upon launch, the launch imposes an additional stress requiring a rigid connection between the mirror and the actuators, significant moments and loads being generated on the mirror because of the offset additional masses borne by the mirror (notably the mass of the floating heads).

SUMMARY OF THE INVENTION

The invention aims to mitigate all or some of the above-mentioned problems by proposing a deformable mirror having a membrane that can be deformed by an actuator also comprising a flat plate and link elements situated between the actuator and the membrane to decouple from the membrane the parasitic torques deriving from the actuator, to relieve the dynamic loads and moments occurring on the mirror in the launch phases and also under gravity.

To this end, the subject of the invention is a deformable mirror comprising a deformable membrane extending at rest in a first plane and having a reflecting front face and a back face opposite the front face, a supporting structure, an actuator having a first and a second end, the first end being fixed to the supporting structure, the second end being able to be displaced relative to the first end on a first axis substantially at right angles to the first plane to exert, on the back face, an axial load on the first axis, so as to locally deform the deformable membrane, a plate that is substantially flat in a second plane substantially parallel to the first plane, positioned between the actuator and the deformable membrane, linked to the back face and capable of being deformed when the actuator exerts the axial load, and the plate is rigid in the second plane so as to take up loads applied to the mirror in the second plane.

According to one embodiment, the mirror comprises an elastic element positioned between the plate and the deformable membrane.

According to another embodiment, the plate is linked to the back face via a coupler configured to transmit only an axial load between the actuator and the deformable membrane and to allow a free displacement in the first plane of the deformable membrane relative to the plate.

According to another embodiment, the mirror comprises an elastic element positioned between the plate and the second end of the actuator.

According to another embodiment, the mirror comprises an elastic element positioned between the plate and the supporting structure.

According to another embodiment, the actuator comprises a head that is free in translation in a third plane substantially parallel to the second plane and free in rotation, positioned on the second end of the actuator, and the head is linked to the supporting structure by at least one elastic element, so as to limit the displacement of the second end of the actuator.

According to another embodiment, the mirror comprises an embedding foot linking the deformable membrane to the supporting structure, and the plate has an end fixed in the embedding foot.

According to another embodiment, the plate is hollowed so as to promote its deformation when the actuator exerts the axial load.

According to another embodiment, the mirror comprises a plurality of actuators each having a first end and a second end, the first end being fixed to the supporting structure, the second end being able to be displaced relative to the first end on a first axis substantially at right angles to the first plane to exert, on the back face, an axial load on the first axis, so as to locally deform the deformable membrane.

The invention relates to any embodiment resulting from a combination of two or more of the embodiments cited above.

BRIEF DESCRIPTION OF THE DRAWINGS

The invention will be better understood and other advantages will become apparent on reading the detailed description of several embodiments given by way of example, the description being illustrated by the attached drawing in which.

In the interests of clarity, the same elements will bear the same references in the different figures.

DETAILED DESCRIPTION

Figure 1:
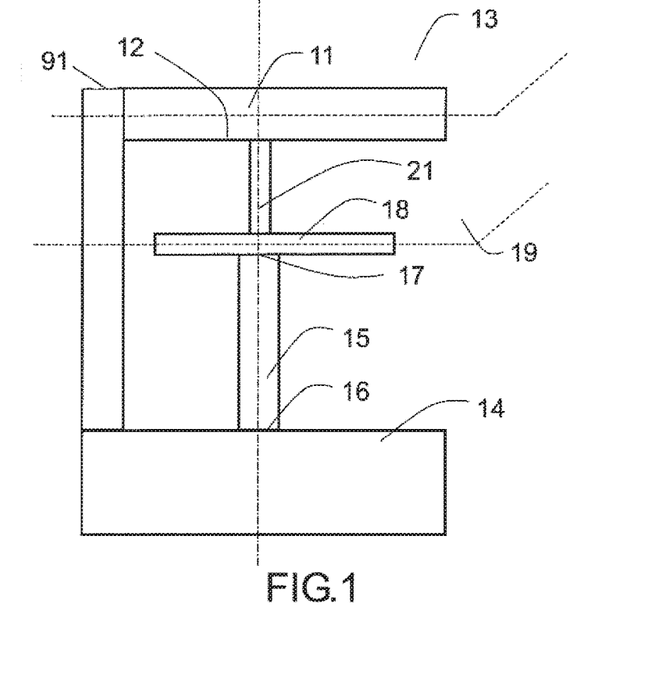
FIG. 1 schematically represents a first embodiment of a deformable mirror according to the invention.

FIG. 1 schematically represents a first embodiment of a deformable mirror 10 according to the invention. The deformable mirror 10 comprises a deformable membrane 11 extending at rest in a first plane 13 and having a reflecting front face and a back face 12, opposite the front face, a supporting structure 14, an actuator 15 having a first 16 and a second 17 end, the first end 16 being fixed to the supporting structure 14, the second end 17 being able to be displaced relative to the first end 16 on a first axis Z substantially at right angles to the first plane 13 to exert, on the back face 12, an axial load on the first axis Z, so as to locally deform the deformable membrane 11. According to the invention, the deformable mirror 10 comprises a plate 18 that is substantially flat in a second plane 19 substantially parallel to the first plane 13, positioned between the actuator 15 and the deformable membrane 11, linked to the back face 12 and capable of being deformed when the actuator 15 exerts the axial load, and the plate 18 is rigid in the second plane 19 so as to take up loads applied to the mirror 10 in the second plane 19.

The flat plane 18 can also be called filtering flat plate because of its action filtering loads, parasitic torques and moments applied to the mirror 10. Moreover, the fact that the plate 18 is rigid in the second plane 19 so as to take up the loads applied to the mirror 10 is to be taken in a broad sense in which the term "loads" also includes the parasitic torques and moments applied to the mirror.

The deformable mirror 10 is represented schematically with a single actuator 15. The invention applies also to a deformable mirror comprising two, three, or, more generally, a plurality of actuators. A deformable mirror can typically comprise 24 actuators. The number of actuators of a deformable mirror can also be as high as 100. A large number of actuators makes it possible to obtain a high degree of accuracy of deformation of the deformable membrane.

Each actuator exerts an axial load on the axis Z on the back face of the deformable membrane. More specifically, the actuator is configured to pull on the back face of the deformable membrane substantially at right angles to the plane of the deformable membrane. The actuator can also push on the back face of the deformable membrane substantially at right angles to the plane of the deformable membrane. Thus, the actuator exerts a uniaxial load on the axis Z on the deformable membrane to deform it.

The plate 18 is rigid in its plane 19 and flexible out of its plane in order to absorb all the loads in its plane 19. The plate 18 consists of a metal material, for example titanium or stainless steel. The plate 18 can be thin, for example of the order of 0.5 mm for a deformable membrane of the order of 3.5 mm thick.

Advantageously, the deformable mirror 10 can comprise an elastic element 21 positioned between the plate 18 and the deformable membrane 11. The elastic element 21 can, for example, be a spring or a foam or any other element exhibiting a certain elasticity. The elastic element 20 makes it possible to obtain a significant reduction ratio between the actuator 15 and the deformable membrane 11 and makes it possible to filter torques and moments deriving from the actuators.

Figure 2:
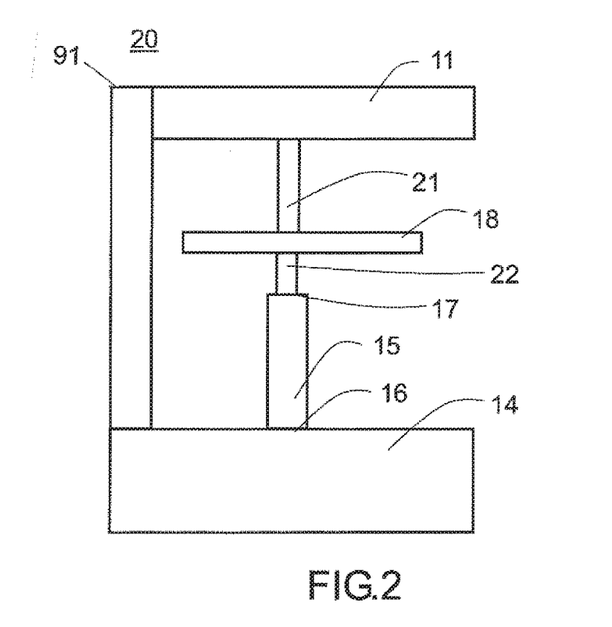
FIG. 2 schematically represents a second embodiment of a deformable mirror according to the invention.

FIG. 2 schematically represents a second embodiment of a deformable mirror 20 according to the invention. The deformable mirror 20 comprises the same elements as the deformable mirror 10 presented in FIG. 1 but is differentiated from the deformable mirror 10 by the fact that it comprises an elastic element 22 positioned between the plate 18 and the second end 17 of the actuator 15. This configuration makes it possible to limit the displacement of the second end 17 of the actuator 15 and thus obtain a significant accuracy of deformation of the deformable membrane 11 when the actuator 15 exerts an axial load on the axis Z. The elastic element 22 can, for example, be a spring or a foam or any other element exhibiting a certain elasticity. The elastic element 22 makes it possible to obtain, as a function of the chosen stiffness of the elastic element 22, a significant reduction ratio between the actuator 15 and the deformable membrane 11. Depending on the possible displacement of the actuator 15 and on the stiffness chosen for the element 22, it is possible, when the actuator 15 generates an axial load on the back face of the deformable membrane 11, to obtain a controlled deformation of the deformable membrane 11.

Figure 3:
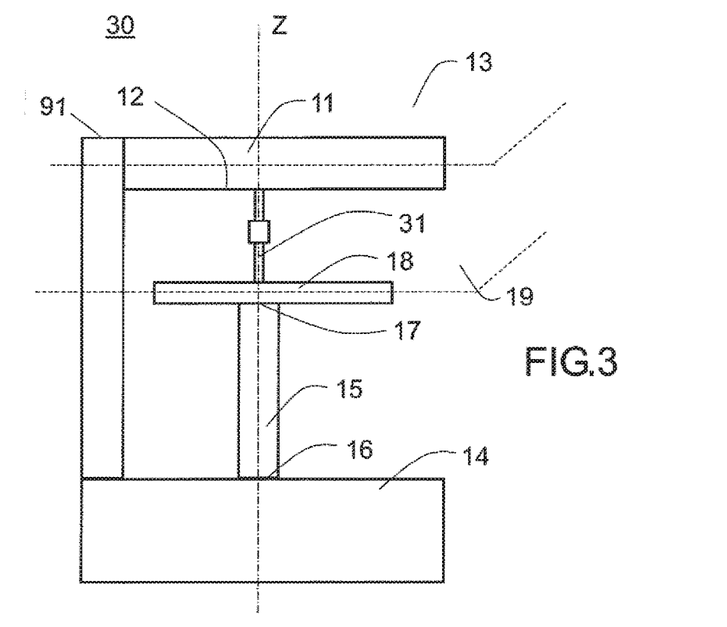
FIG. 3 schematically represents a third embodiment of a deformable mirror according to the invention.

FIG. 3 schematically represents a third embodiment of a deformable mirror 30 according to the invention. The deformable mirror 30 comprises the same elements as the deformable mirror 10 presented in FIG. 1 but is differentiated from the deformable mirror 10 by the fact that the plate 18 is linked to the back face 12 via a coupler 31 configured to transmit only an axial load between the actuator 15 and the deformable membrane 11 and to allow a free displacement in the first plane of the deformable membrane 11 relative to the plate 18. The coupler 31 can for example be a longitudinal metal part, also called connecting rod, advantageously having a very low expansion coefficient. The coupler 31 can be made of titanium, stainless steel or an alloy of 64% iron and 36% nickel. The coupler 31 can have reductions in cross section making it possible to create a flexural flexibility filtering the parasitic moments, these moments being taken up by the filtering plate 18.

The deformable mirror 30 is represented schematically with a single coupler 31. The invention applies also to a deformable mirror comprising two, three, or, more generally, a plurality of couplers 31 distributed uniformly or non-uniformly between the plate 18 and the deformable membrane 11.

Figure 4:
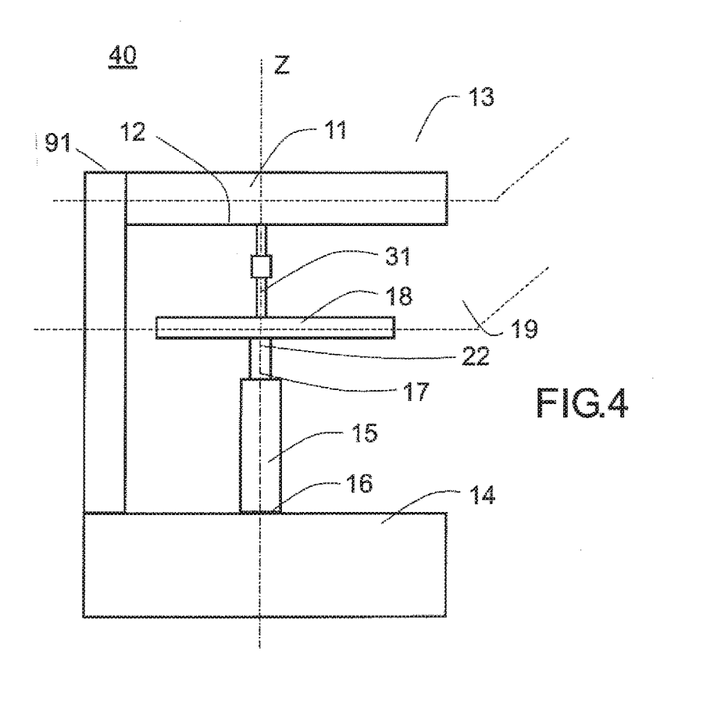
FIG. 4 schematically represents a fourth embodiment of a deformable mirror according to the invention.

FIG. 4 schematically represents a fourth embodiment of a deformable mirror 40 according to the invention. The deformable mirror 40 comprises the same elements as the deformable mirror 30 presented in FIG. 3 but is differentiated from the deformable mirror 30 by the fact that it comprises an elastic element 22 positioned between the plate 18 and the second end 17 of the actuator 15. This configuration makes it possible to limit the displacement of the second end 17 of the actuator 15 and thus obtain a significant accuracy of deformation of the deformable membrane 11 when the actuator 15 exerts an axial load on the axis Z.

Figure 5:
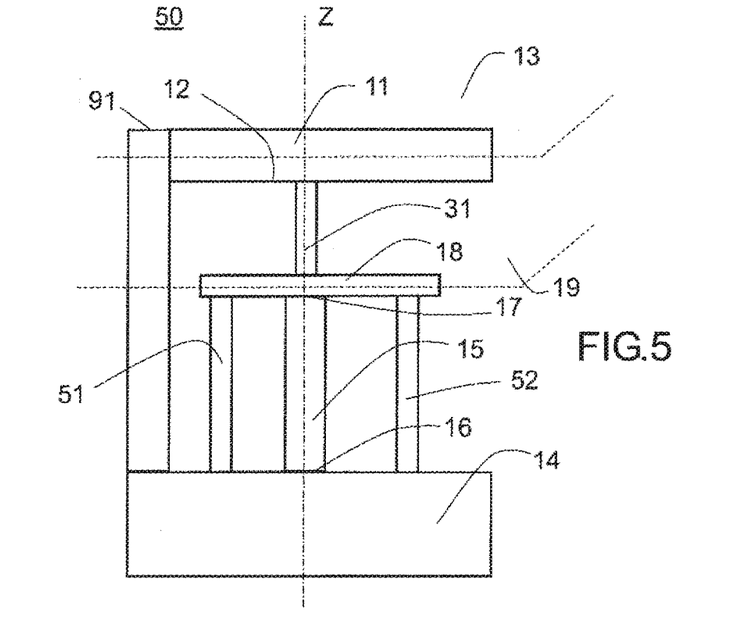
FIG. 5 schematically represents a fifth embodiment of a deformable mirror according to the invention.

FIG. 5 schematically represents a fifth embodiment of a deformable mirror 50 according to the invention. The deformable mirror 50 comprises the same elements as the deformable mirror 10 presented in FIG. 1 but is differentiated from the deformable mirror 10 by the fact that it comprises an elastic element 51 positioned between the plate 18 and the supporting structure 14. The elastic element 51 can, for example, be a spring or a foam or any other element exhibiting a certain elasticity. The elastic element 51 makes it possible to limit the displacement of the second end 17 of the actuator 15 and thus obtain a significant accuracy of deformation of the deformable membrane 11 when the actuator 15 exerts an axial load on the axis Z.

Figure 6:
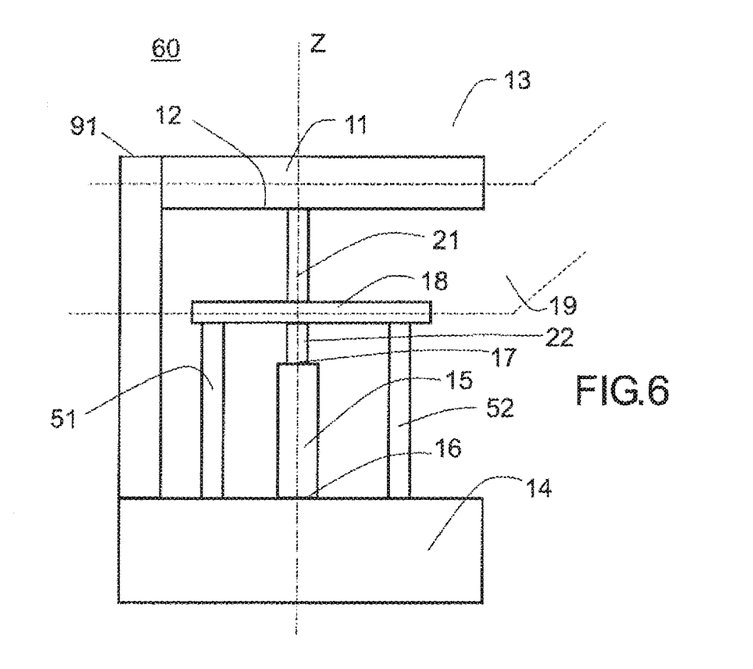
FIG. 6 schematically represents a sixth embodiment of a deformable mirror according to the invention.

FIG. 6 schematically represents a sixth embodiment of a deformable mirror 60 according to the invention. The deformable mirror 60 comprises the same elements as the deformable mirror 50 presented in FIG. 5 but is differentiated from the deformable mirror 50 by the fact that it comprises an elastic element 22 positioned between the plate 18 and the second end 17 of the actuator 15. This configuration makes it possible to limit the displacement of the second end 17 of the actuator 15 and thus obtain a significant accuracy of deformation of the deformable membrane 11 when the actuator 15 exerts an axial load on the axis Z.

In the configuration of the deformable mirror 50 and of the deformable mirror 60, it is possible to have a second elastic element 52 positioned between the plate 18 and the supporting structure 14. For example, the plate 18 can be linked to the supporting structure 14 by plurality of elastic elements, for example three elastic elements around each actuator, advantageously positioned at 120°.

Figure 7:
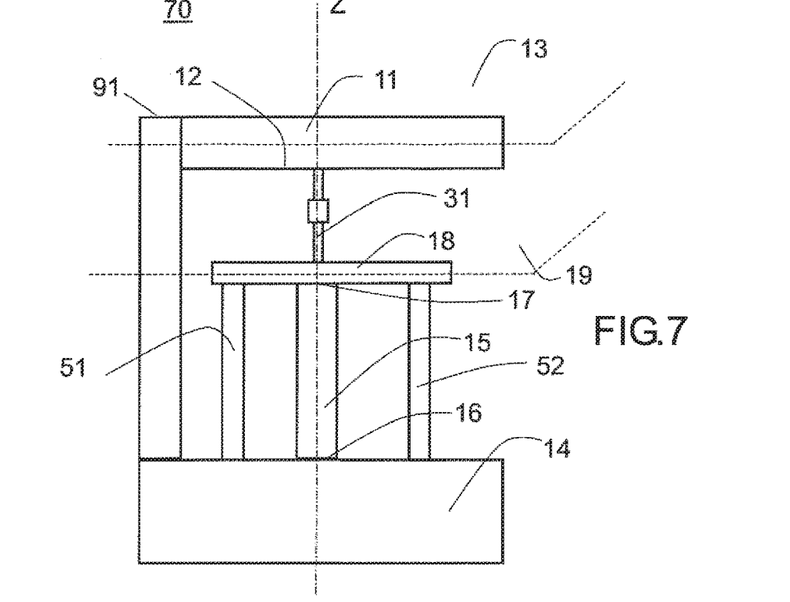
FIG. 7 schematically represents a seventh embodiment of a deformable mirror according to the invention.

FIG. 7 schematically represents a seventh embodiment of a deformable mirror 70 according to the invention. The deformable mirror 70 comprises the same elements as the deformable mirror 50 presented in FIG. 5 but is differentiated from the deformable mirror 50 by the fact that the plate 18 is linked to the back face 12 via a coupler 31 configured to transmit only an axial load between the actuator 15 and the deformable membrane 11 and to allow a free displacement in the first plane of the deformable membrane 11 relative to the plate 18. As explained previously for the deformable mirror 30 represented in FIG. 3, the coupler 31 can for example be a longitudinal metal part, also called connecting rod, advantageously having a very low expansion coefficient. The coupler 31 can be made of titanium, stainless steel or an alloy of 64% iron and 36% nickel. The coupler 31 can have reductions in cross section making it possible to create a flexural flexibility filtering the parasitic moments.

As previously, the deformable mirror 70 is represented schematically with a single coupler 31. The invention applies also to a deformable mirror comprising two, three, or, more generally, a plurality of couplers 31 distributed uniformly or non-uniformly between the plate 18 and the deformable membrane 11.

Figure 8:
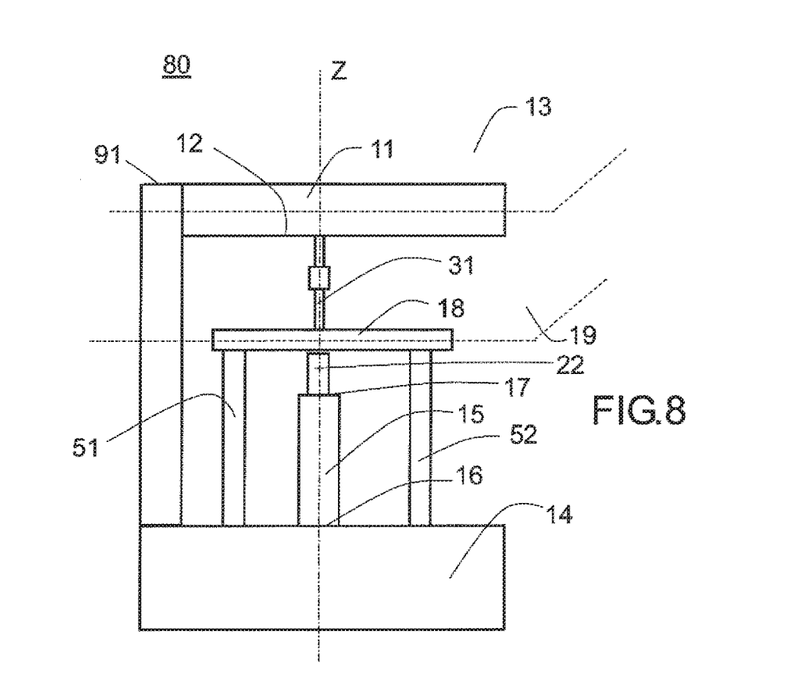
FIG. 8 schematically represents an eighth embodiment of a deformable mirror according to the invention.

FIG. 8 schematically represents an eighth embodiment of a deformable mirror 80 according to the invention. The deformable mirror 80 comprises the same elements as the deformable mirror 70 presented in FIG. 7 but is differentiated from the deformable mirror 70 by the fact that it comprises an elastic element 22 positioned between the plate 18 and the second end 17 of the actuator 15. This configuration makes it possible to limit the displacement of the second end 17 of the actuator 15 and thus obtain a significant accuracy of deformation of the deformable membrane 11 when the actuator 15 exerts an axial load on the axis Z.

Figure 9:
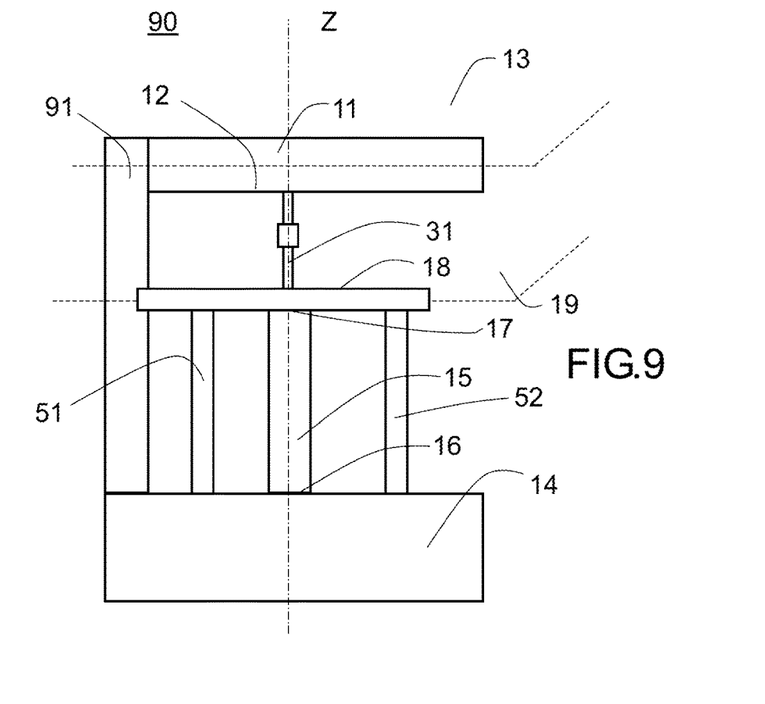
FIG. 9 schematically represents a ninth embodiment of a deformable mirror according to the invention.

FIG. 9 schematically represents a ninth embodiment of a deformable mirror 90 according to the invention. The deformable mirror 90 comprises the same elements as the deformable mirror 70 presented in FIG. 7 but is differentiated from the deformable mirror 70 by the fact that it comprises an embedding foot 91 linking the deformable membrane 11 to the supporting structure 14, and the plate 18 has an end fixed in the embedding foot 91. The embedding foot 91 links the deformable membrane 11 to the supporting structure 14. The embedding foot 91 can be central. In this case, the deformable membrane is linked at its centre to the embedding foot. For example, the embedding foot 91 can comprise a ring onto which is adhesively bonded the deformable membrane so as to hold the deformable membrane in position. The deformable mirror according to the invention can also comprise a plurality of embedding feet (for example three embedding feet positioned at 120°), for example positioned at the periphery of the mirror. In this case, the deformable membrane is linked to the embedding feet in its peripheral zone or can also be so linked on an intermediate diameter of the mirror.

The fact that the plate 18 has an end fixed in the embedding foot 91 makes it possible to reduce the stresses which are applied to it, particularly during the launch.

Figure 10:
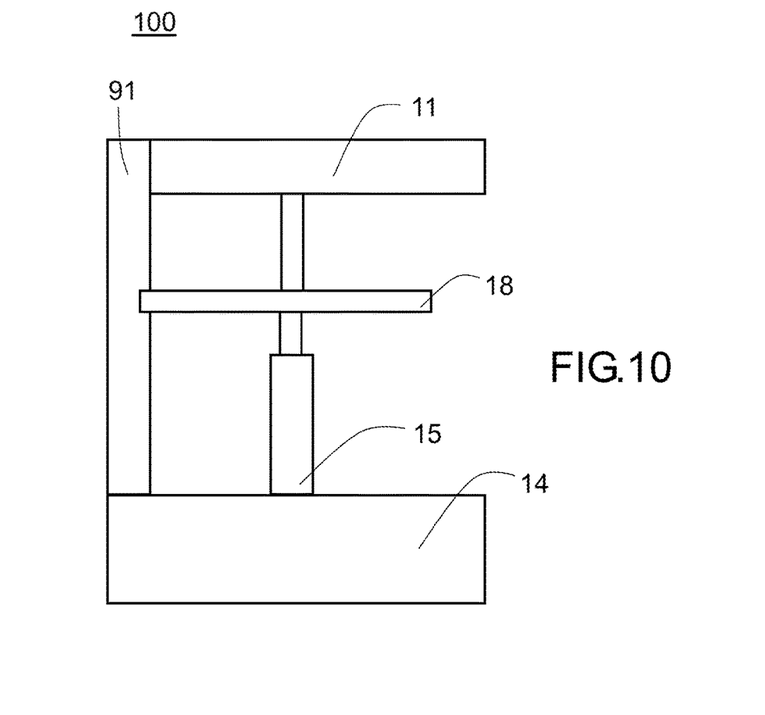
FIG. 10 schematically represents a tenth embodiment of a deformable mirror according to the invention.

FIG. 10 schematically represents a tenth embodiment of a deformable mirror 100 according to the invention. The deformable mirror 100 comprises the same elements as the deformable mirror 10 presented in FIG. 1 but is differentiated from the deformable mirror 10 by the fact that the plate 18 has an end fixed in the embedding foot 91, as explained previously in the embodiment presented in FIG. 9.

It should be noted that the variant of the plate 18 having an end fixed in the embedding foot 91 can be applied to all the embodiments presented above.

More generally, all the features presented in each of the embodiments presented previously can be combined without departing from the scope of the invention.

Figure 11:
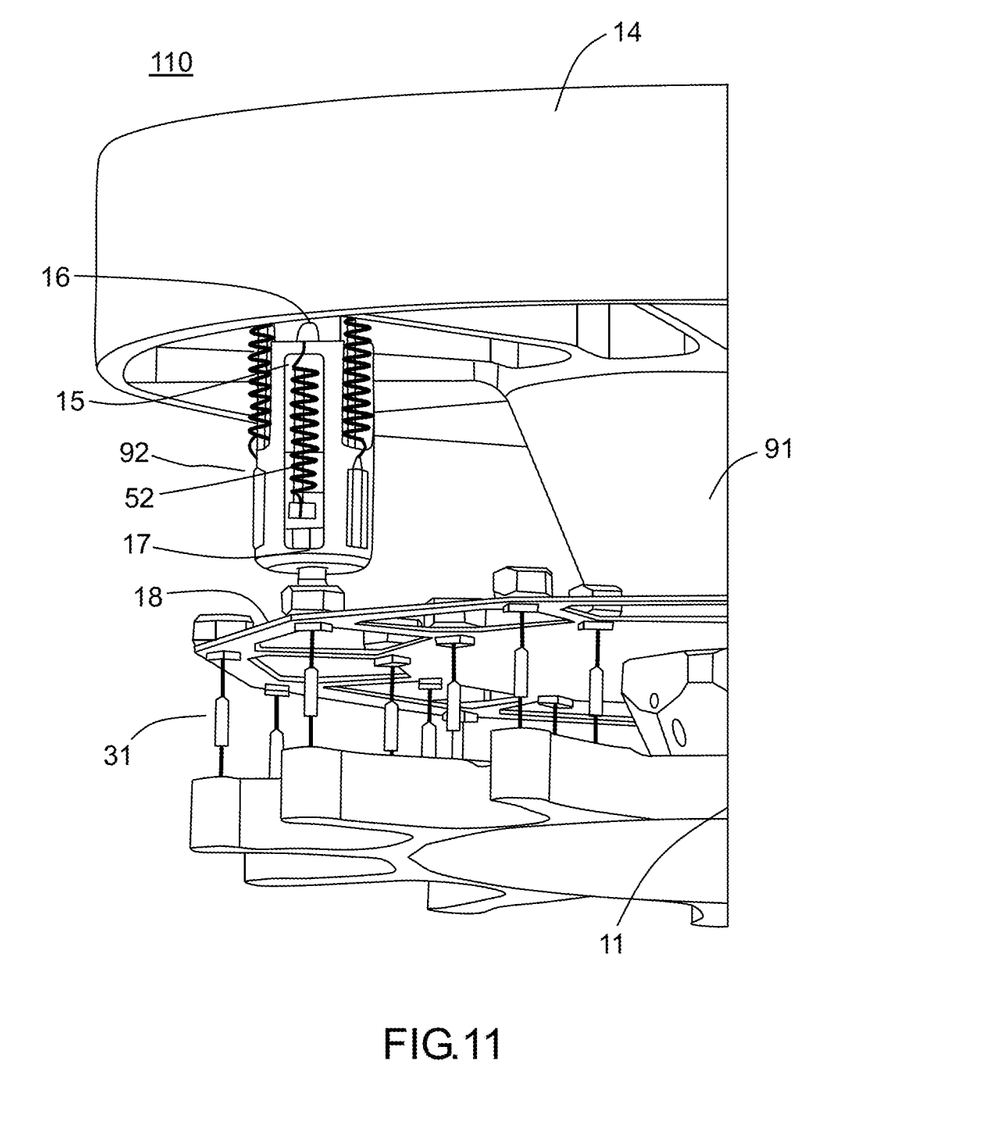
FIG. 11 schematically represents an eleventh embodiment of a deformable mirror according to the invention, FIG. 12 schematically represents a twelfth embodiment of a deformable mirror according to the invention comprising a plurality of actuators.

FIG. 11 schematically represents an eleventh embodiment of a deformable mirror 110 according to the invention. The deformable mirror 110 comprises the same elements as the deformable mirror 90 presented in FIG. 9 but is differentiated from the deformable mirror 90 by the fact that the actuator 15 comprises a head 92 that is free in translation in a third plane substantially parallel to the second plane and free in rotation, positioned on the second end 17 of the actuator 15, and the head 92 is linked to the supporting structure 14 by at least one elastic element 52, so as to limit the displacement of the second end 17 of the actuator 15. The head 92 is said to be floating because it is free in rotation and in translation and is only subjected to a uniaxial load on the axis of the actuator 15. The head 92 makes it possible to divide the displacement of the second end 17 of the actuator 15 by a certain factor.

A single floating head is represented in FIG. 11 but the invention applies also to a deformable mirror comprising a plurality of floating heads, up to one floating head per actuator.

It can be noted that the embodiment with floating head can be combined with all the other embodiments already presented. Nevertheless, with an elastic element between the actuator 15 and the plate 18 or between the plate 18 and the supporting structure 14, the floating head 92 is not necessary since the displacement of the second end 17 of the actuator 15 is then limited by the elastic element or elements.

Advantageously, the plate 18 can be hollowed, in order to make it supple, so as to promote its deformation when the actuator 15 exerts the axial load. Thus, it is possible to obtain a good deformation of the plate 18 without increasing the loads that each actuator 15 has to supply. Moreover, by hollowing the plate 18, a slight saving on weight of the deformable mirror is obtained.

Figure 12:
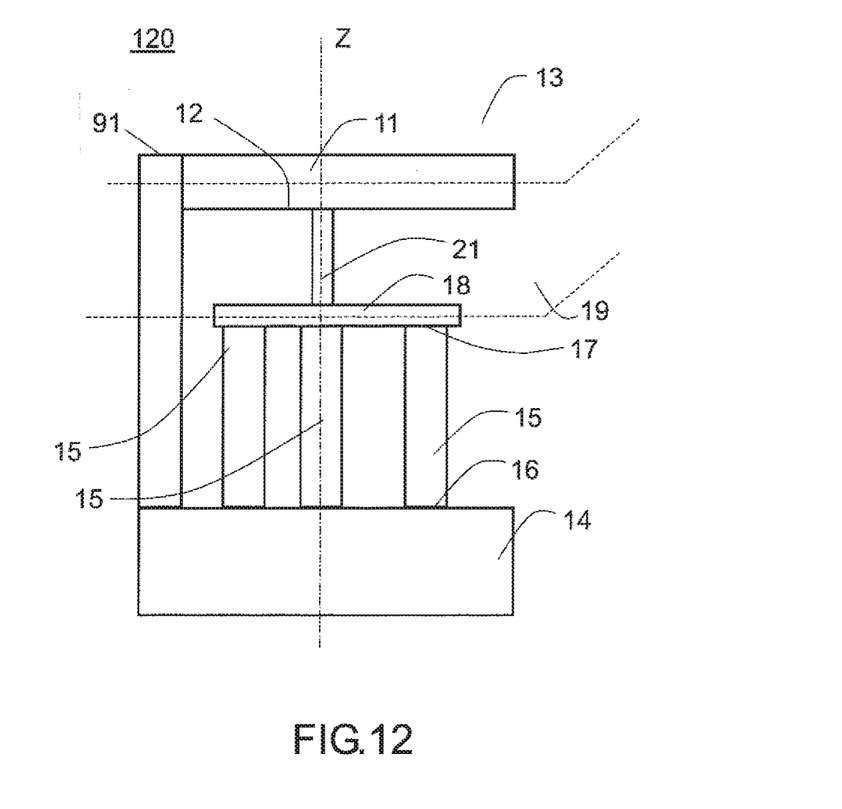

FIG. 12 schematically represents a twelfth embodiment of a deformable mirror 120 according to the invention comprising a plurality of actuators. The deformable mirror 120 comprises the same elements as the deformable mirrors presented in the preceding figures. In effect, the invention relates also to a deformable mirror comprising a plurality of actuators each having a first and a second end, the first end being fixed to the supporting structure, the second end being able to be displaced relative to the first end on a first axis substantially at right angles to the first plane to exert, on the back face, an axial load on the first axis, so as to locally deform the deformable membrane. The actuators can be distributed uniformly or not on the supporting structure, and their number is generally defined as a function of the dimensions of the deformable membrane.

The invention claimed is:

1. A deformable mirror comprising:
   a deformable membrane extending at rest in a first plane and having a reflecting front face and a back face opposite the front face,
   a supporting structure,
   an actuator having a first and a second end, the first end being fixed to the supporting structure, the second end being able to be displaced relative to the first end on a first axis substantially at right angles to the first plane to exert, on the back face, an axial load on the first axis, so as to locally deform the deformable membrane,
   a plate that is substantially flat in a second plane substantially parallel to the first plane, positioned between the actuator and the deformable membrane, linked to the back face and capable of being deformed when the actuator exerts the axial load, and the plate is rigid in the second plane so as to take up loads applied to the mirror in the second plane, and
   an elastic element positioned between the plate and the supporting structure, wherein the second end of the actuator is configured to exert the axial load on the plate.

2. The deformable mirror according to claim 1, comprising another elastic element positioned between the plate and the deformable membrane.

3. The deformable mirror according to claim 1, wherein the plate is linked to the back face via a coupler configured to transmit only an axial load between the actuator and the deformable membrane and to allow a free displacement in the first plane of the deformable membrane relative to the plate.

4. The deformable mirror according to claim 1, comprising another elastic element positioned between the plate and the second end of the actuator.

5. The deformable mirror according to claim 1, wherein the actuator comprises a head that is free in translation in a third plane substantially parallel to the second plane and free in rotation, positioned on the second end of the actuator, and wherein the head is linked to the supporting structure by at least one elastic element, so as to limit displacement of the second end of the actuator.

6. The deformable mirror according to claim 1, comprising an embedding foot linking the deformable membrane to the supporting structure, and wherein the plate has an end fixed in the embedding foot.

7. The deformable mirror according to claim 1, wherein the plate is hollowed so as to promote its deformation when the actuator exerts the axial load.

8. The deformable mirror according to claim 1, comprising a plurality of actuators each having a first and a second end, the first end being fixed to the supporting structure, the second end being able to be displaced relative to the first end on the first axis to exert, on the back face, an axial load on the first axis, so as to locally deform the deformable membrane.

* * * * *